United States Patent [19]

Ratti

[11] 4,117,937

[45] Oct. 3, 1978

[54] ASSEMBLY FOR HOUSING, CONVEYING AND BRINGING-FORTH TOOLS DURING THE OPERATION OF NUMERICALLY CONTROLLED MACHINES

[75] Inventor: Mario Ratti, Bresso (Milan), Italy

[73] Assignee: S.U.S.T.A. S.p.A., Milan, Italy

[21] Appl. No.: 740,241

[22] Filed: Nov. 8, 1976

[30] Foreign Application Priority Data

Nov. 10, 1975 [IT] Italy ............................. 22639 A/75

[51] Int. Cl.² .............................................. A47F 7/00
[52] U.S. Cl. .................................. 211/60 T; 280/79.3; 211/189
[58] Field of Search ................. 211/60, 186, 187, 189, 211/128, 129, 133, 150, 134; 248/220.2, 220.3, 220.4, 221.1, 222.2, 222.3, 222.4, 223.2; 206/44.11, 45, 372, 376; 280/79.1, 79.2, 79.3, 47.19, 47.35; 224/48

[56] References Cited

U.S. PATENT DOCUMENTS

| | | | |
|---|---|---|---|
| 1,242,441 | 10/1917 | Hills | 248/223.2 X |
| 2,327,631 | 8/1943 | Fibus | 211/128 X |
| 2,344,937 | 3/1944 | Brazier | 211/126 X |
| 2,815,129 | 12/1957 | Highwood | 224/48 R |
| 2,830,825 | 4/1958 | Webber et al. | 280/79.3 |
| 2,959,294 | 11/1960 | Rosenquist et al. | 248/251 X |
| 2,966,991 | 1/1961 | Duffner | 211/60 R |
| 3,186,363 | 6/1965 | Moore | 211/187 R X |
| 3,631,821 | 1/1972 | Zachariou | 211/187 X |

FOREIGN PATENT DOCUMENTS

442,038  2/1965  Switzerland ..................... 280/47.35

Primary Examiner—Roy D. Frazier
Assistant Examiner—Terrell P. Lewis
Attorney, Agent, or Firm—Wenderoth, Lind & Ponack

[57] ABSTRACT

An assembly includes a dolly and a plurality of supports removably fitted at different levels within the dolly, for the housing, conveying and bringing forth of tools, particularly in the operation of numerically controlled machines. Secured to each of the supports are a plurality of cone-shaped bushes, wherein tools can be accommodated and retained. The supports are removably secured to the dolly, each in a selected of a plurality of positions.

7 Claims, 5 Drawing Figures

U.S. Patent     Oct. 3, 1978     4,117,937
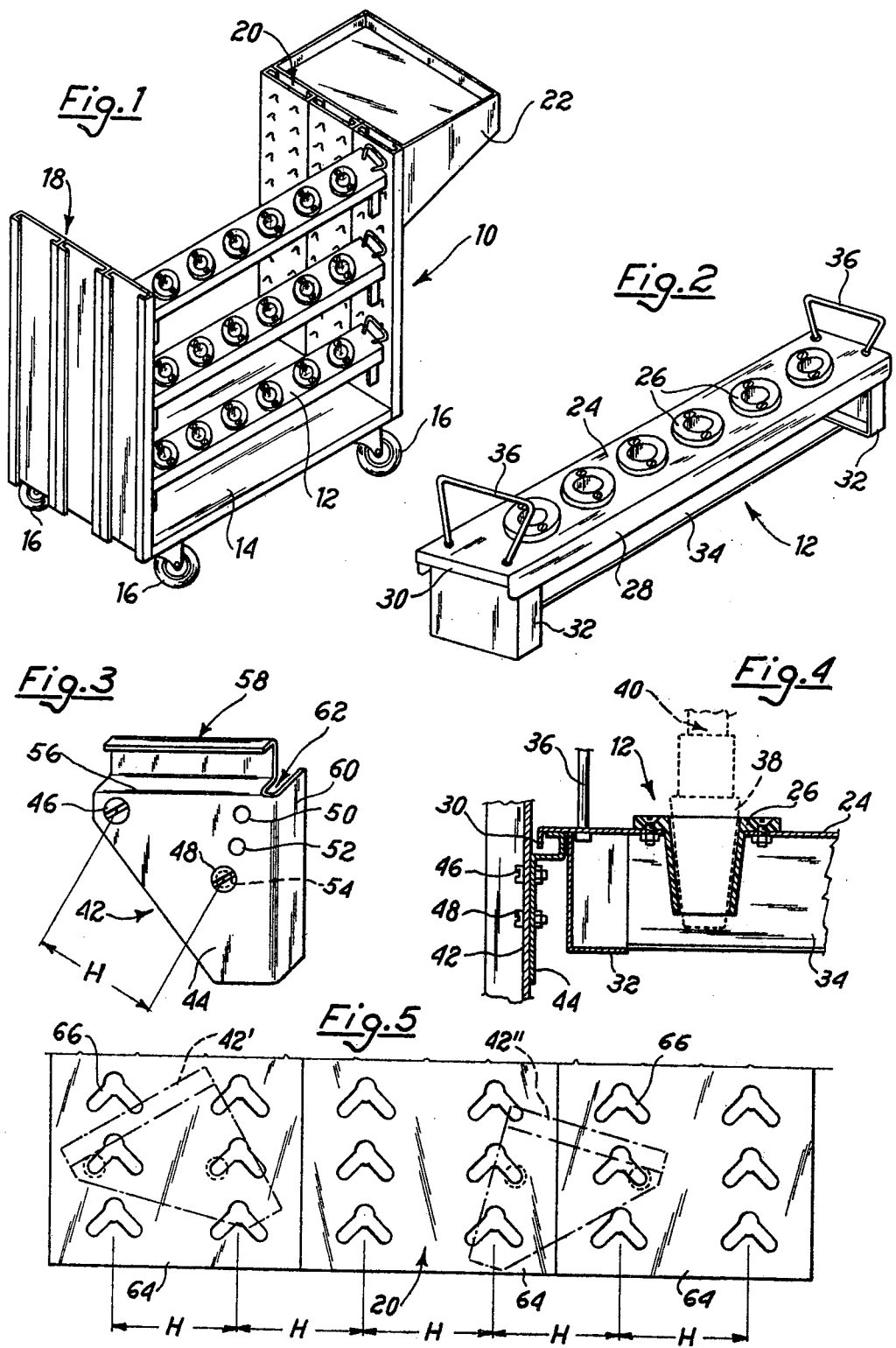

ASSEMBLY FOR HOUSING, CONVEYING AND BRINGING-FORTH TOOLS DURING THE OPERATION OF NUMERICALLY CONTROLLED MACHINES

BACKGROUND OF THE INVENTION

The present invention relates to an assembly including a dolly and a plurality of supports which are removably mounted at different levels in the dolly for housing, conveying and bringing forth a plurality of tools, particularly in the operation of machines of the numerically controlled type.

More specifically, the present invention is directed to an assembly of the type identified above and for the purposes as referred to, but which has a novel configuration and arrangement of components, whereby an improved convenience and practicality of application and use is conferred to the assembly and to the components thereof, above all in the operation of numerically controlled machine tools.

As is well known, a plurality of different tools is usually required by machines of the numerically controlled type, such tools being changed by the operator when one or more of the programmed operations performed by each machine is to be modified. Therefore, as is also known, each machine is usually serviced by a dolly, whereon all tools which may be required on a given machine are arranged in an ordered manner, to allow the operator to remove therefrom the tools required for the next machining step, and to replace in an orderly manner all the tools removed from the machine that are no longer required. It is also known to arrange the tools on a plurality of supports that are individually removable from the body of the dolly, so that the supports, along with their tools, may be placed within closed containers, e.g. cabinets or chests of drawers, to thereby store the tools when immediate utilization thereof is not foreseen.

Different ways for the realization of such assembly are already known. There is known a structure comprising supports shaped as flat, shallow trays, wherein tool retaining components are slidingly fitted on guides, so as to lock the components in any required position. Such shallow trays can be hooked at both ends thereof on two front walls of the dolly, and when needed the trays can be removed therefrom and replaced, along with their tools, in drawers or the like. In such a case, the tools are always arranged vertically, both in the dolly and in the drawers, in the latter position by means of suitable feet with which the supports are fitted. However, this implies a remarkable difficulty on the part of the operator when taking up or putting back tools located in lower levels of the dolly. Additionally, the vertical arrangement in drawers is made more difficult by the particular position in which the tools are retained, since the tools may project substantially below the related supporting plane.

In another already known arrangement, recourse is made to supports having a first vertical wall fitted with hooking means and a second further wall which is inclined with respect to the first wall, the tools being housed on the second wall. In this case, no difficulties are encountered in removing the tools from the dolly or in replacing them. However, further drawbacks arise due to the danger of particularly long tools which project out of the dolly, as well as to the necessity of having the supports housed in a particular way (i.e. on vertical racks) within closed containers.

SUMMARY OF THE INVENTION

By the arrangement of the present invention all of the above drawbacks of already known systems are positively prevented. The present invention includes an assembly of the type hereinbefore referred to, but which is essentially characterized in that each of the supports is fitted with a plurality of cone-shaped bushes, in each of which a tool can be accommodated and retained, by the engagement with the cone end thereof. The supports are removably secured to the dolly, each support in a position that can be selected at will amongst a plurality of positions, whereby the related tools are either vertically arranged or - when required - inclined at different angles to the vertical. Thus, it is possible to simultaneously solve both the problem of insuring that the single tools are readily accessible and may be easily placed in the proper order even on the lower shelves of the dolly, and the problem of preventing that particularly long tools dangerously project outwardly from the dolly, such projecting being prevented both by adjusting the inclination of the supports, and thus of the tools, and by arranging the supports in suitable positions which may be shifted toward the middle portion of the dolly.

Moreover, each of the supports comprises a surface whereon a plurality of bushes can be fitted perpendicularly thereto, as well as supporting means by which such surface can be kept in a horizontal position and at a distance from any supporting plane which is greater than or equal to the maximum projection of the tools below such surface. Thus, the problem of having the supports and the related tools appropriately put back, e.g. into drawers, when the utilization thereof in the near future is not foreseen is wholly solved.

BRIEF DESCRIPTION OF THE DRAWINGS

A preferred embodiment of the present invention will now be described with reference to the accompanying diagrammatic drawings, both the description and drawings intended as being exemplary only and not restrictive. In the drawings:

FIG. 1 is a perspective view of one possible embodiment of a dolly according to this invention, wherein a plurality of supports, also according to the invention, are fitted.

FIG. 2 is a perspective view of one of the supports.

FIG. 3 is a perspective view of one embodiment of a bracket for the removable connection of the supports with the dolly.

FIG. 4 is a partial sectional view, taken on a plane containing the axes of bushes wherein the tools can be engaged, and showing the end portion of a support which is fitted on the dolly by means of one of the brackets.

FIG. 5 is a partial front view showing the openings that are formed in one of the dolly walls, for the engagement of brackets and of supports.

DETAILED DESCRIPTION OF THE INVENTION

Referring now to the drawings, and first of all to FIG. 1 thereof, an assembly for servicing numerically controlled machine tools essentially consists of a dolly 10, and of a plurality of supports 12 removably secured thereto. In the considered example, the dolly 10 is formed by a lower platform 14 fitted with bearing wheels 16. Extending upwardly from the ends of platform 14 are vertical walls 18 and 20 which — as explained in more detail below — are formed with suitably shaped openings, to allow for the removable attachment, in positions and with inclinations that can be selected at will, of supports 12 thereto. In the particularly illustrated case, the two walls 18 and 20 are each formed by a plurality of aligned channel irons (three in the illustrated case), each having a desired and necessary length. However, as will be readily appreciated, such walls may be also otherwise formed, depending on the service requirements of the dolly.

Borne by the dolly wall 20 is a, e.g., shallow tray shaped support 22, wherein tools and other items as required by the operator are contained.

Shown in FIG. 2 is one of such supports 12, that essentially consists of a rectangular plate 24 to which a plurality of cone-shaped bushes 26, made e.g. of plastics and being of known type, are firmly secured, with the tapered portions of the bushes protruding downwardly. Downwardly bent portions 28 and 30 are formed on the edges of plate 24, while secured to the lower side thereof are two box-shaped bearing elements 32, located at a given distance from end bent portions 30.

Bearing elements 32 are possibly connected with one another by a lower plate 34, which has a folded configuration and which is connected by one longitudinal side only with the upper plate 24. Support 12 may be fitted with a pair of handgrips 36 for a better convenience of manipulation, and can then be placed and aligned in any bearing plane, e.g. on the bottom of a drawer, with the related tools vertically arranged and retained by their Morse, ISO or metric cones 38 in the bushes 26, as shown in FIG. 4 for the tool 40. The length of bearing elements 32 is such as to be equal to, or greater than the maximum downward projection of tools 40, to thereby allow the support 12 and supported tools to be placed on any suitable plane.

The supports 12, as shown, are removably secured to walls 18 and 20 of dolly 10 by brackets 42, of the type as shown in FIG. 3. Such brackets essentially consist of a flat plate 44, fitted with attachment means by which it can be engaged with the openings in the walls 18 and 20. Such attachment means may consist e.g. of two screws or bolts 46 and 47, extending outwardly from plate 44. The second screw 48 is adjustable in such a manner as to be brought into coincidence with different holes 50, 52 and 54 formed in plate 44. The lines from such holes 50, 52 and 54 to screw 46 extend at different angles, e.g. ranging from 0° up to 30°, with the upper edge 56 of flat plate 44. Moreover, bracket 42 is formed with a C-shaped portion 58 which extends from upper edge 56, as well as with a tongue 60 bent at a right angle, i.e. orthogonal, to C-shaped portion 58, as clearly shown in FIG. 3.

As hereinbefore stated, and as will be considered in more detail below, two brackets 42 are engaged in congruent positions with suitable openings of walls 18 and 20 of dolly 10, and a support 12 is mounted on such two brackets, by having the C-shaped portion 58 of each bracket 42 seated into the free space between the bent portion 30 and the bearing element 32 at each end of support 12, as shown in FIG. 4. Moreover, the side projection 28 of support 12 is engaged into the slot 62 formed between the edges of components 58 and 60 of each bracket 42, thereby preventing a possible overturning of the support 12, even when it is positioned at the maximum inclination, and when very long and/or heavy tools are supported thereon. Also, even such long and/or heavy tools are safely retained in the bushes 26 of related supports 12, due to the fit of tool cones 38 in the tapered portions of bushes 26.

As previously stated, the brackets 42 can be fastened at any required inclination, at least within certain design limits, by merely engaging the screw 48 into one of holes 50, 52 or 54. However, the possibility also exists to place brackets 42 in a required or suitable position, not only in a vertical direction, but also in a horizontal direction on the dolly walls 18 and 20. One of such walls is partly shown in FIG. 5, from which it can be noticed that the channel irons 64, of which the wall is formed, are each provided with two rows of inverted V-shaped orifices 66, each having a widened apex, to allow for the introduction of the heads of screws 46 and 48. The openings 66 are arranged in rows at a constant center-to-center distance H, which is also equal to the constant spacing between the axes of screws 46 and 48, whether screw 48 is in hole 50, 52 or 54. Thus, each bracket 42 can be engaged and supported with respect to any pair of horizontally aligned openings 66, and can be inclined as required. Thereby, it is possible to prevent the tools secured to the support 12 which is engaged with the brackets 42, from dangerously extending out of or beyond clearance edges of dolly 10. Thus e.g., in FIG. 5, the bracket 42' is arranged for supporting tools having a standard length, while the less inclined and rearwardly displaced bracket 42" is suited for supporting particularly long tools.

It is to be understood that many changes and structural modifications may be made to the specifically disclosed and illustrated embodiment, above all on the basis of the practical requirements of use to be met in any given case. Thus, e.g., the support 12 could be fitted or hung, similarly as in the dolly, within a cabinet or the like that can be closed.

What we claim is:

1. An assembly for use in supporting and conveying a plurality of tools, said assembly comprising:
   a conveyable dolly including a base and a pair of parallel spaced walls extending substantially vertically upwardly from said base, said walls extending vertically to define the height of said dolly and horizontally to define the depth of said dolly;
   a plurality of tool supports dimensioned to extend between said pair of walls, each said support having fixed thereto a plurality of downwardly-tapered conically-shaped bushing means for supporting therein tools;
   a plurality of pairs of brackets, one said pair of brackets being associated with a respective one of said supports and including a first bracket to be mounted on a first of said walls and a second bracket to be mounted on a second of said walls;
   each said bracket including means for supporting an end of a respective said support such that each support is supported at opposite ends thereof by the respective pair of brackets at a fixed orientation to said respective pair of brackets; and
   means for attaching each said pair of brackets to said walls at a selected fixed position of a plurality of positions varying horizontally and vertically with respect to said walls and rotatively with respect to the orientation of said brackets and said supports, and for thereby mounting said respective supports to said dolly at a selected position with respect to the height and depth of said dolly and at a selected orientation such that said bushing means extend vertically or at a selected inclination to the vertical, said attaching and mounting means comprising:
a plurality of openings in each said wall, said openings in each said wall being spaced from each other both horizontally and vertically of said wall, the openings in said pair of walls being aligned;
a first hole in each said bracket, and a plurality of second holes in each said bracket, each of said second holes being spaced an equal distance from said first hole; and
first and second bolt means associated with each said bracket, said first bolt means extending through said first hole of said bracket and a first selected said opening of the respective wall, and said second bolt means extending through a selected of said second holes of said bracket and a second selected opening of said respective wall.

2. An assembly as claimed in claim 1, wherein said openings are spaced by equal center-to-center distances.

3. An assembly as claimed in claim 1, wherein each said opening has the configuration of an inverted V, the apex of which is widened.

4. An assembly as claimed in claim 1, wherein each said support includes a flat plate having openings therein, said bushing means extending downwardly through said openings, and handgrips attached to and extending upwardly from said first plate.

5. An assembly for use in supporting and conveying a plurality of tools, said assembly comprising:
a conveyable dolly including a base and a pair of parallel spaced walls extending substantially vertically upwardly from said base, said walls extending vertically to define the height of said dolly and horizontally to define the depth of said dolly;
a plurality of tool supports dimensioned to extend between said pair of walls, each said support having fixed thereto a plurality of downwardly-tapered concially-shaped bushing means for supporting therein tools;
a plurality of pairs of brackets, one said pair of brackets being associated with a respective one of said supports and including a first bracket to be mounted on a first of said walls and a second bracket to be mounted on a second of said walls;
each said bracket including means for supporting an end of a respective said support such that each support is supported at opposite ends thereof by the respective pair of said brackets at a fixed orientation to said respective pair of brackets;
each said bracket comprising a flat plate having a C-shaped projection extending outwardly from the upper side thereof, and each said support having extending downwardly from each opposite end thereof an end bent portion and a bearing element spaced inwardly from said end bent portion, said end bent portion and bearing element defining therebetween a space, said support being positioned such that said C-shaped projections of the respective said brackets extend upwardly into said spaces between said end bent portions and said bearing elements; and
means for attaching each said pair of brackets to said walls at a selected fixed position of a plurality of positions varying horizontally and vertically with respect to said walls and rotatively with respect to the orientation of said brackets and said supports, and for thereby mounting said respective supports to said dolly at a selected position with respect to the height and depth of said dolly and at a selected orientation such that said bushing means extend vertically or at a selected inclination to the vertical.

6. An assembly as claimed in claim 5, wherein each said bracket has an inwardly and upwardly extending flange spaced from said C-shaped projection by a slot, and each said support has extending downwardly from a side thereof a side bent portion, said side bent portion extending downwardly into said slot.

7. An assembly as claimed in claim 5, wherein each said support includes a flat plate having openings therein, said bushing means extending downwardly through said openings, and handgrips attached to and extending upwardly from said flat plate.

* * * * *